United States Patent [19]
Lück

[11] Patent Number: 5,234,538
[45] Date of Patent: Aug. 10, 1993

[54] PROCESS FOR PRODUCING POLYMER FILM FILTERS

[75] Inventor: Hans B. Lück, Dresden, Fed. Rep. of Germany

[73] Assignee: Oxyphen GmbH, Rossendorf, Fed. Rep. of Germany

[21] Appl. No.: 831,271

[22] Filed: Feb. 7, 1992

[30] Foreign Application Priority Data

Feb. 8, 1991 [DE] Fed. Rep. of Germany ....... 4103853

[51] Int. Cl.$^5$ .......................... B44C 1/22; B29C 37/00
[52] U.S. Cl. .................................... 156/644; 156/628; 156/643; 156/654; 156/668; 156/345
[58] Field of Search .............. 156/628, 643, 633, 644, 156/654, 655, 668, 345; 250/492.1, 492.2, 492.3

[56] References Cited
U.S. PATENT DOCUMENTS

| | | | |
|---|---|---|---|
| 3,415,993 | 12/1968 | Fleischer et al. | 156/644 X |
| 3,852,134 | 12/1974 | Bean | 156/643 X |
| 4,416,724 | 11/1983 | Fischer | 156/668 X |
| 4,832,997 | 5/1989 | Balanzat et al. | 156/643 X |

Primary Examiner—William A. Powell
Attorney, Agent, or Firm—Browdy and Neimark

[57] ABSTRACT

Polymer filter film for which pores are etched along beam tracks only in a first, porous region (P1), and which has a second, impermeable region (R1), in particular in the form of a peripheral region. The peripheral region (R1) is made etch-resistant by a heat treatment of the beam tracks. Advantageous embodiments of the method are used to produce microchambers in the film for holding a cell culture. They can advantageously be used for enzymatic sensors and microbiological reactors.

14 Claims, 2 Drawing Sheets

PROCESS FOR PRODUCING POLYMER FILM FILTERS

FIELD OF INVENTION

The invention relates to a process for producing a polymer film filter that has at least a first filter region with pores, which are continuously etched in an ensuing etching step along continuous beam tracks generated in an irradiation step, and which has at least one second, noncontinuous porous region that is closed in a manner free of incipient pores, as a support structure.

BACKGROUND

German Published, Non-Examined Patent Application DE-OS No. 37 04 56 discloses a production process for such polymer film filters in which a film having a support structure is produced by plastic injection molding in an injection mold; the film is then masked suitably and acted upon with penetrating irradiation only on the thin film regions which are not intended to function as the support walls, and the beam tracks of the irradiation are then widened into micropores by means of a solvent. This process is suitable only for producing filters of this kind individually, because an injection mold for producing a structure of film thickness must be produced and operated with very high accuracy and close tolerances, and this limits its size. The subsequent steps can also be carried out only with complicated, labor-intensive individual filter manipulation. This results in a very expensive product.

U.S. Pat. No. 3,852,134 discloses a process for producing polymer film filters in a continuous operation, the filters having continuous pores only in predetermined regions. These filters are produced in such a way that the dense film is exposed to particle irradiation the tracks of which cause etchable structural faults. These tracks are sensitized in the predetermined regions by irradiation with ultraviolet light, after which a first pre etching is done until the sensitized tracks are etched through with narrow pores, but wherein the unsensitized tracks penetrate the film only partly. After that, a heat treatment that repairs the remaining tracks is performed, after which the narrow pores are widened in a further etching step. In this way, the non-porous regions are covered with blind bores. This five-step process, with five passages of the films, is quite complicated and labor. intensive.

U.S. Pat. No. 3,438,50 also discloses the production of polymer filters, which have continuous pores only in predetermined regions, in a continuous operation by irradiating the film through an irradiation-impermeable mask with particle irradiation that produces tracks, after which the etching of the tracks to make pores is performed. The disadvantage here is that the mask must already be furnished for the film irradiation, which is done in a vacuum and is expensive, and must be introduced into the vacuum chamber and there moved along with the film, and a later predetermination of the porous regions is not possible. The mask which moves along with the film makes it more difficult to introduce very fine masking patterns.

SUMMARY

An object of the invention is to provide a continuous process for producing the polymer film filters of the general type referred to above, which in a substantially simpler manner allows predetermination of arbitrary selected regions, also having fine structuring, that are not porous, and without producing any blind bores.

This object is attained by a continuous process wherein, after the production of the beam tracks, the second region is repaired in a heat treatment step and thereby made etch-resistant, and only after that, in the etching step, are the remaining beam tracks in the first filter region etched through, forming pores.

In an advantageous further feature, the polymer films are etched down to a substantially lesser thickness in the porous regions, in that the film is treated beforehand with a harder irradiation that penetrates the film with penetrating tracks, and is also acted upon with an irradiation that penetrates the film with a greater track density but only partway. The heat treatment repairs both types of beam tracks, so that the repaired regions remain practically unchanged in the ensuing etching, while the densely irradiated layer is dissolved and the weakly irradiated remaining film layer is etched through with pore along the tracks.

The novel product produced in the manner described above is extraordinarily capable of load bearing, given suitable texturing of the pore-free regions, while being highly permeable despite small pore widths. Smooth regions capable of bearing weight can be formed peripherally of a filter, and in the inner filter region load-bearing web structures, for instance in the manner of honeycombs, are advantageously formed, between which the thin porous regions are located.

The membranes with honeycomb like chambers and a porous bottom are suitable for special applications, because the chambers are of such size that they can hold micro. organisms, which on the other hand cannot penetrate the narrow pores. Such microchamber membranes are suitable as membranes for microbial and enzymatic sensors, which have a defined and fast response, because of the exact placement of the micro. organisms or immobilized enzymes and because of the high permeability of the relatively short pores.

Such microchamber membranes can also be used to produce miniature bioreactors; especially advantageously, two membranes at a time are disposed facing one another on the chamber sides, while nutrient is delivered on the filter side and products of metabolism are removed on the other side.

BRIEF DESCRIPTION OF DRAWING

The invention is shown by way of example in conjunction with FIGS. 1 to 7, wherein.

DETAILED DESCRIPTION OF EMBODIMENTS

Figure 1:
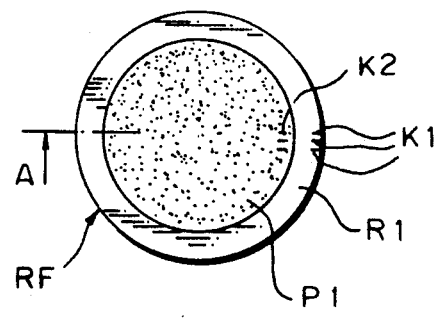
FIG. 1 is a plan view of a membrane filter with a dense peripheral region.

FIG. 1 is a plan view of a round filter (RF), which is intended to be fastened by its unperforated encompassing peripheral region (R1) into a commercially available filter apparatus; because of its great strength and its smooth surface, it provides high tightness and easier manipulation. Since the peripheral region (R1) is transparent compared with the inner region (P1) which has a matte appearance because of the perforation, manipulation of the filter when it is removed from a package and inserted into a filter holder can be done easily and securely with tweezers on the periphery, so that destruction of the perforation is reliably avoided.

The sealing ring, which rests in the socket on the peripheral region, where it is tightened, does not produce any creases or cracks there, either. Moreover, provision is made for making a readily identifiable indicia bearing zone (K1, K2) of the applicable filter type, either in the outer peripheral region (R1) in the form of perforated markings (K1) with a matte appearance, or in the inner region (P1) in the form of transparent unperforated markings (K2); when the filter is produced, these markings are made by means of a suitable local heat treatment in the heat-curing step, and they then become visible as a result of the etching treatment. In this way, it is always easily possible to select and insert the correct filter type for a particular application, and mistakes can be precluded.

Figure 2:
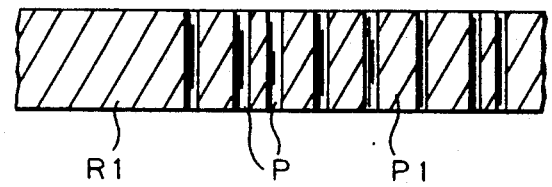
FIG. 2 shows an enlarged detail cross-section taken along line 2—2 of FIG. 1.

FIG. 2 is a partial cross section of FIG. 1 through part of the filter (RF), on a larger scale. The peripheral region (R1) is pore-free, and the inner region (P1) is penetrated by etched pores (P), which are embodied in a known manner along the beam paths, at right angles to the filter extension. The commercially available polymer films that are used to produce the filter are between 4 and 50 $\mu$m thick, and depending on the field of application they are made of polyester, polycarbonate or some other polymer. The suitable known etching agents should be selected accordingly; the known pretreatment processes for increasing the etching rate are also applicable, and preferably the repair of beam damage is first done by means of the known selective heating process step (normally done at a different stage), so that a pretreatment in the repaired regions (R1) cannot gain a foothold for attack.

Figure 3:
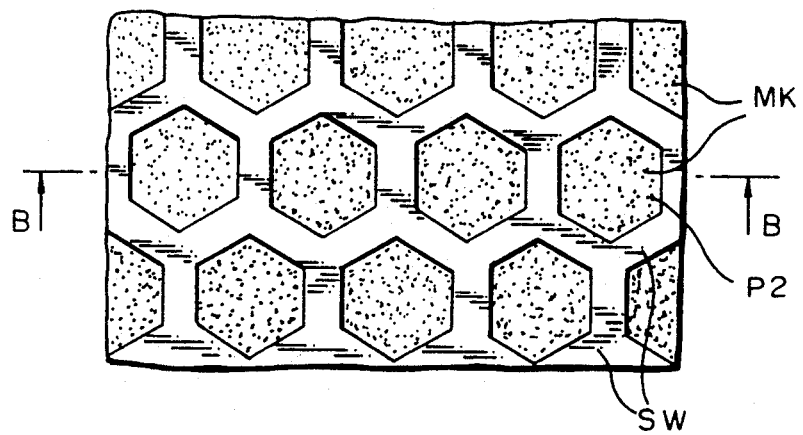
FIG. 3 is an enlarged detail of a plan view of a microchamber membrane.
Figure 4:
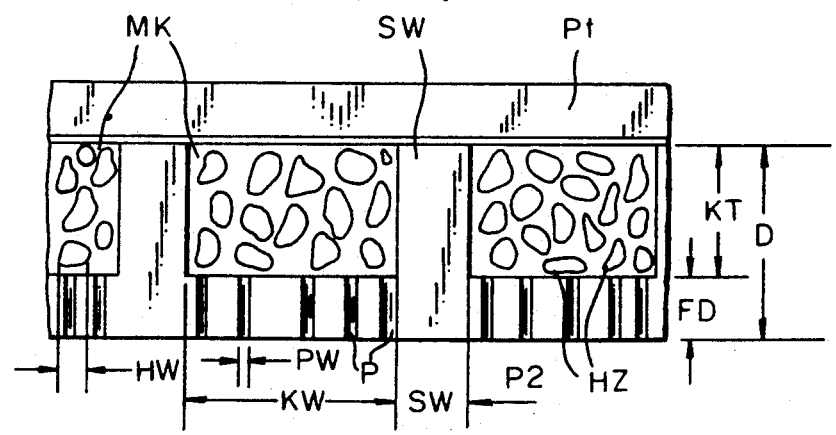
FIG. 4 is a schematic cross section taken along line 4—4 of FIG. 3 in an application with microbiological cells.

FIG. 3 is an enlarged detail of a plan view of a polymer film filter, in which support walls (SW) in a honeycomb arrangement are formed by the selective heat treatment; as shown in FIG. 4, a section along line 4—4 of FIG. 3 through the enlarged filter region, they surround microchambers (MK), the bottom region of which forms a perforated inner region (P2).

The microchambers (MK) are etched down to a chamber depth (KT) of 15 $\mu$m, for instance, into a polymer film having a thickness D of 20 $\mu$m, for instance; between the microchambers, the support walls (SW) created by the heat repair have remained, and their bottoms are etched through with filter pores (P), made through the film pretreated with a penetrating irradiation with a relatively slight irradiation density, so that the bottom regions form the actual inner filter region (P2). The filter thickness (FD) is determined from the film thickness (D) and the range, which is approximately equivalent to the chamber depth (KT), of the intensive, nonpenetrating irradiation to which the film was exposed prior to the heat treatment and etching.

In the example shown, the microchambers (MK) are filled with yeast cells (HZ), the dimensions of which, of approximately 3 $\mu$m, are larger than the pore width (PW) of approximately 1 $\mu$m, so that the cells are enclosed there. The support walls (SW) rest for instance on an electrode, e.g. a platinum electrode (Pt), of an electronic sensor, and a remaining medium, which is decomposed in a known manner by the yeast cells, is located outside the filter and in the microchambers (MK), so that in a known manner the products of decomposition can be detected at the electrode.

The yeast cells have room on all sides in the microchambers, because the support walls maintain their volume when the film is fastened in place. This has the advantage that the yeast cells can work unhindered, which is not assured in conventional sensors, in which the cells are under pressure depending on the tension on the film and the degree to which the space between the film and the electrode is filled. Moreover, the yeast culture quantity is determined quite accurately by the microchambers, and the free volume of the medium that surrounds them is also defined and relatively small, so that the sensor responds in a defined manner and quite fast when it is placed in a test medium and can be standardized and calibrated in a standardizing fluid quite quickly as soon as it is immersed in it, and has little hysteresis.

Figure 5:
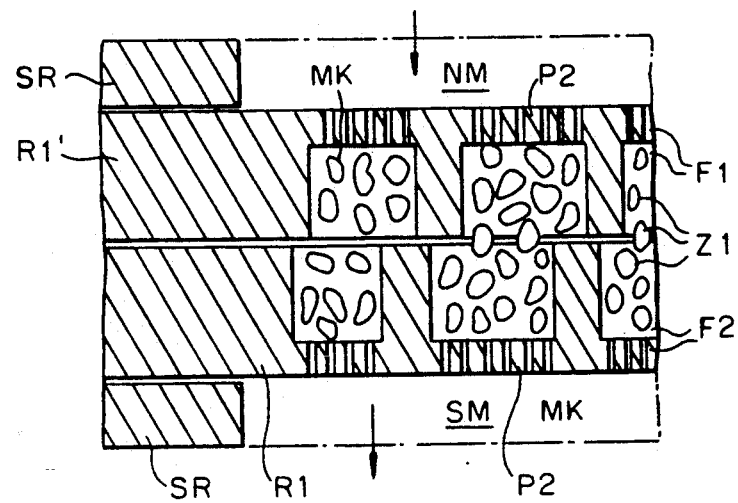
FIG. 5, on a larger scale, shows details of a microbiological reactor, using a microchamber membrane.

FIG. 5 shows a small peripheral detail of a biological microreactor, in which two microchamber membranes (F1, F2) are disposed facing one another on the chamber side. The chambers are filled with microbiological cells (Z1) that cannot pass through the pores (P1). The nutrient medium (NM) is delivered from one side of the reactor, and on the other side the medium (SM) containing the products of metabolism is removed.

The two microchamber membranes (F1, F2) are welded by their unperforated peripheral regions (R1 and R1') or are enclosed and compressed in a clamping means (SR).

Figure 6:
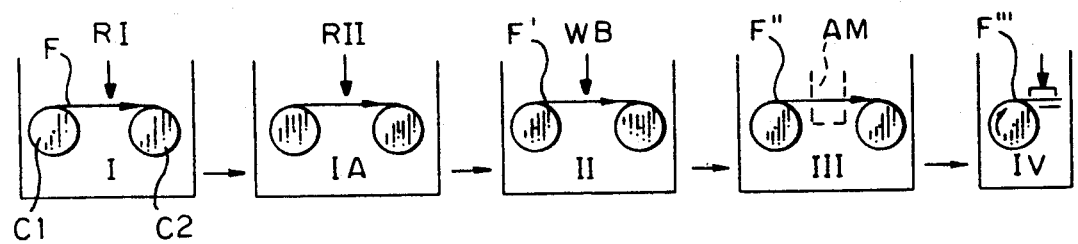
FIG. 6 shows a process diagram.

FIG. 6 schematically shows a process diagram.

In a first method step (I), the polymer film (F) from a first roll (C1) is wound onto a second roll (C2) at a given speed past an irradiation source (RI), which transmits the penetrating irradiation.

If a microchamber membrane is to be produced, then in an intermediate step (IA), which however can also be combined with the first step (I), a second irradiation takes place with an irradiation source (RII), which produces a lower-energy particle irradiation that does not penetrate the film.

The irradiated film (F') can be temporarily stored as desired and is an independent commercial intermediate product.

In a second method step (II), the irradiated film (F') is subjected to a selective heat treatment (WB) suitable for the particular application, such as by being compressed between a pair of patterned heating rollers, and rewinding again takes place.

In a third method step (III), the irradiated, heat-treated film (F'') is treated in the etching medium (AM) until the pores and optionally chambers are finished, whereupon an interruption of etching and then rinsing take place in a known manner.

A stamping step (IV) follows at the end, in which the round blanks are stamped out in accordance with the etched-out patterns.

Figure 7:
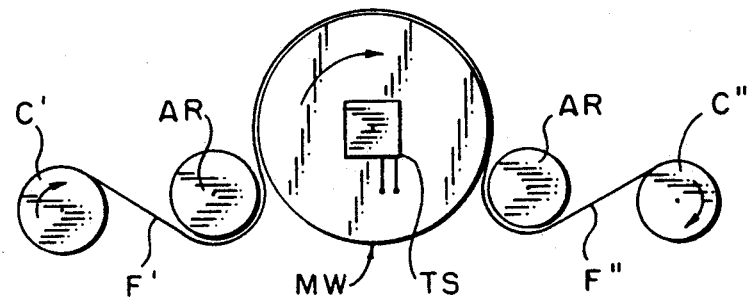
FIG. 7 shows a first apparatus for local heat treatment.

FIG. 7 schematically shows a first apparatus for heat-treatment of the irradiated film (F'). The film is unwound from a roll (C') by the tension of a driven mask roller (MW) and is pressed against it by two contact rollers (AR) that are staggered circumferentially so that it wraps around it; after that, it is wound onto a new roll (C'').

The patterns with which the heat treatment is to be performed, that is, the peripheral regions of the filter sensors and/or the patterns for the webs of the microchambers, are raised on the surface of the mask roller (MW). The various patterns can also be applied in succession to the film independently of one another, by a passage around a plurality of mask rollers (MW) in succession. The mask roller is heated with a heater controlled by a thermostat (TS). This apparatus has the advantage that a relatively fast film passage can be effected, since the heated pattern acts upon the film over a long wraparound distance.

Depending on the type of film material, the repairing treatment of the film takes place at temperatures above the glass transition temperature. However, the temperature should be 30° below the melting temperature, because otherwise disadvantageous changes in the film ensue.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A process for producing a polymer film filter comprising;
    exposing a polymer film to penetrating irradiation in a first region which penetrates the polymer film and thereby generates continuous beam tracks in it,
    selectively heating a second region of the polymer film to a temperature above the glass transition temperature and below the melting temperature of the polymer film for a time sufficient to make the second region etch-resistant, and
    etching the beam tracks to widen them and obtain filter pores.

2. A process according to claim 1, further comprising before the heating step, exposing the polymer film to additional irradiation capable of penetrating the polymer film only part way through and wherein said additional irradiation has an intensity higher than the penetrating irradiation.

3. A process according to claim 2, wherein the additional irradiation penetrates the polymer film to a depth greater than the remaining polymer film thickness.

4. A process according to claim 3, further comprising stamping round blanks registered in accordance to the second region which was subjected to heating.

5. A process according to claim 4, further comprising filling microchambers generated by the irradiation steps with cells before the stamping step.

6. A process according to claim 5, further comprising;
    covering the microchambers filed with cells with a platinum electrode and
    sealing the platinum electrode to the region which was heated.

7. A process according to claim 5, further comprising;
    covering the microchambers filed with cells with a filter and
    sealing the filter to the region which was heated.

8. A process according to claim 1, wherein the irradiated region is a noncontinuous and the heated region is continuous.

9. A process according to claim 4, further comprising filling microchambers generated by the irradiation steps with a microbial culture before the stamping step.

10. A process according to claim 1, wherein the heating is performed by a roller with a raised mask which is maintained at a temperature between the glass transition temperature and the temperature of melting the polymer film and is applied for a duration sufficient to make the region etch resistant.

11. An apparatus for heat treating a previously irradiated polymer film comprising;
    a polymer film unwinder and a polymer film winder in between which are disposed a driven roller and two contact rollers spaced apart circumferentially from the driven roller,
    the rollers being so disposed that the polymer film is wrapped partway around the driven roller,
    wherein a circumferential surface of the driven roller contains a raised mask structure and a heating means for heating the driver roller to a temperature which is above the glass transition temperature and below the melting temperature of the polymer film.

12. An apparatus according to claim 11, wherein the raised mask structure forms a round closed peripheral region without a central region pattern and constitutes means for imparting the pattern to the treated polymer film.

13. An apparatus according to claim 11, wherein the raised mask structure forms a honeycomb structure pattern of microchambers and constitutes means for imparting the pattern to the treated polymer film.

14. An apparatus according to claim 11, wherein the raised mask structure forms a honeycomb structure pattern of microchambers inside and a round closed peripheral region pattern and constitutes means for imparting these patterns to the treated polymer film.

* * * * *